Figure 3:
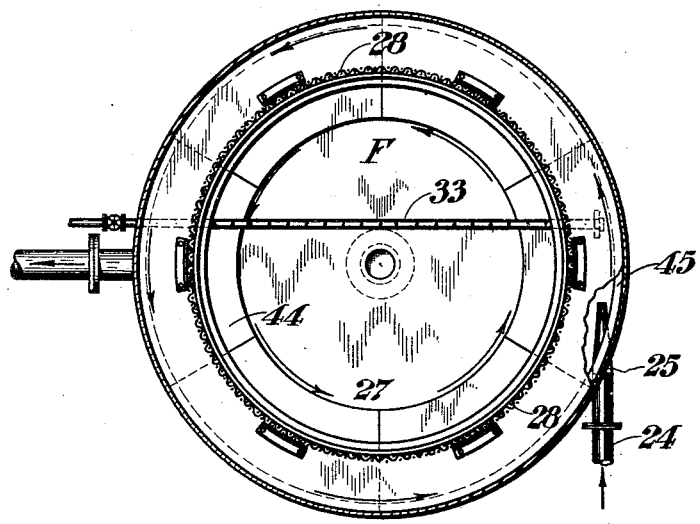

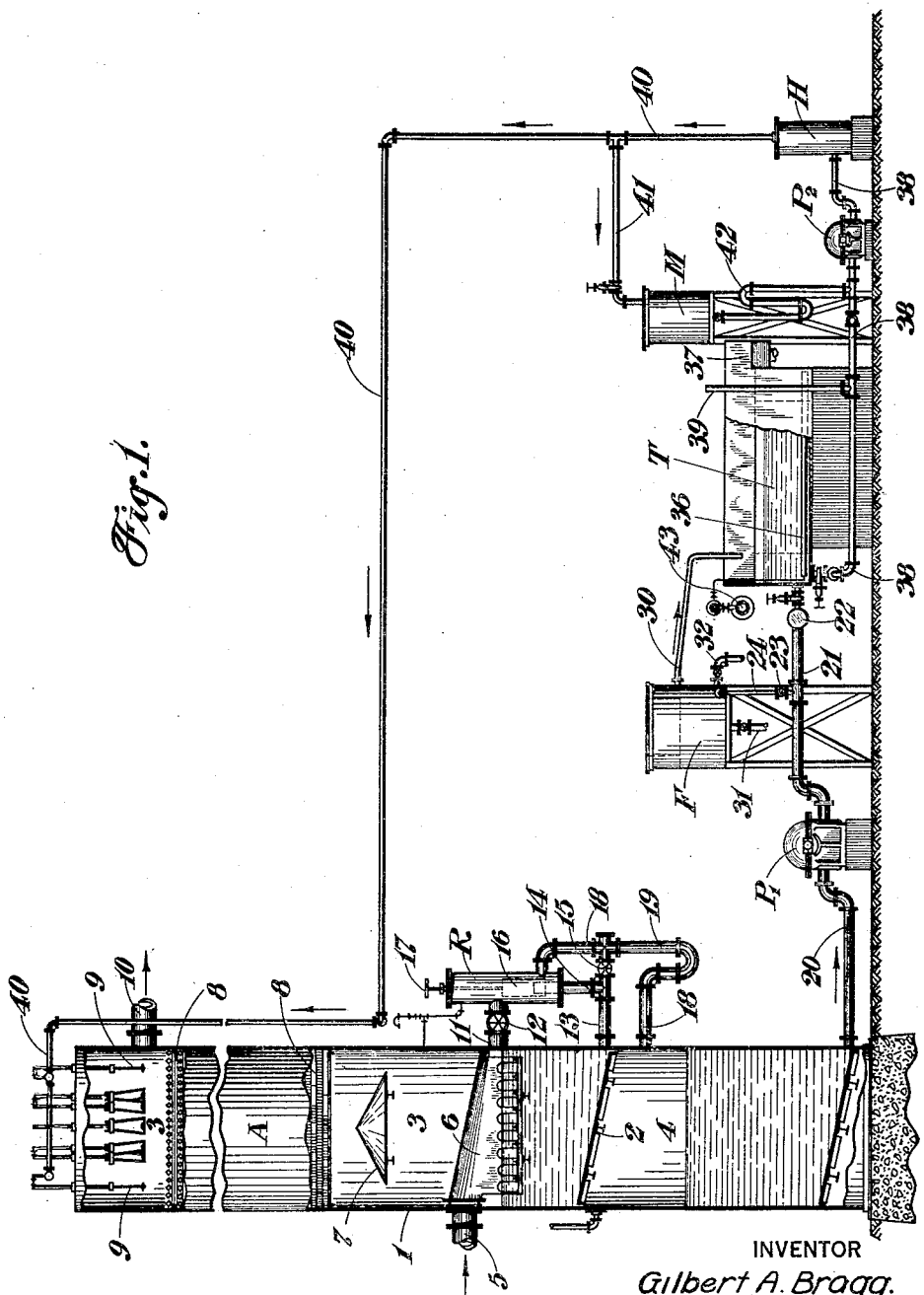

Dec. 1, 1931.  G. A. BRAGG  1,834,764
GAS PURIFICATION PROCESS
Filed June 18, 1926   2 Sheets-Sheet 2

INVENTOR
*Gilbert A. Bragg.*
BY
*Jesse R. Langley*
ATTORNEY

Patented Dec. 1, 1931

1,834,764

UNITED STATES PATENT OFFICE

GILBERT A. BRAGG, OF EAST ORANGE, NEW JERSEY, ASSIGNOR TO THE KOPPERS COMPANY, A CORPORATION OF PENNSYLVANIA

GAS PURIFICATION PROCESS

Application filed June 18, 1926. Serial No. 116,825.

My invention relates to the cyclic liquid purification of coal gas from hydrogen sulphide and analogous impurities, and, more particularly, to processes involving the circulation of alkaline suspensions of iron compounds through a cycle comprising an absorption phase and an actification phase. The presence of iron compound is effective in causing the liberation of free sulphur in the actification stage, thereby preventing the escape of noxious gas into the atmosphere and making possible the recovery of valuable by-products.

Processes and apparatus for gas purification involving the use of such suspensions are shown and described more fully in the copending applications of Frederick W. Sperr, Jr., and David L. Jacobson, Serial No. 730,676, filed August 7, 1924, Frederick W. Sperr, Jr., Serial No. 21,983, filed April 9, 1925, Frederick W. Sperr, Jr., Serial No. 21,979, filed April 9, 1925, and A. Allison Kohr, Serial No. 43,347 filed July 13, 1925, and also in U. S. Patent No. 1,578,560, granted to Frederick W. Sperr, Jr., and have attained considerable commercial importance.

It has been customary in practice to effect the suspension of iron compounds in gas purification liquids by adding iron oxide thereto. There are a large number of grades of such material available and these may contain varying percentages of $Fe_2O_3$, depending upon the moisture content, method of preparation, amount of handling, etc. The residual portions of such materials are comprised of a variety of foreign material, such as wood chips or sticks, earthy matter, stone, and the like, all of which are undesirable with respect to the preparation of the suspensions and the purification of gas.

The old method of adding the iron compound to the gas purification liquid by simply adding batches of it to said liquid when necessary possesses numerous disadvantages. The foreign material present in the material as received is thus added to the liquid and may cause stoppages due to clogging in the absorption or other apparatus. Furthermore, it is difficult, by such simple method, to obtain uniform suspensions.

The objects of my invention are to provide means for adding an insoluble substance, such as iron oxide, to gas purification liquids in circulation in such manner as to effect uniform suspension of the oxide in the liquid and to compensate for losses of the said substance due to side reactions in the process, mechanical losses and the like.

A further object of my invention is to provide means for eliminating solid foreign matter, such as is generally contained by the iron oxide when received.

My invention consists in such other new and useful improvements and has, for further objects, such other operative advantages or results as may be found in the apparatus and process hereinafter described or claimed.

Figure 2:
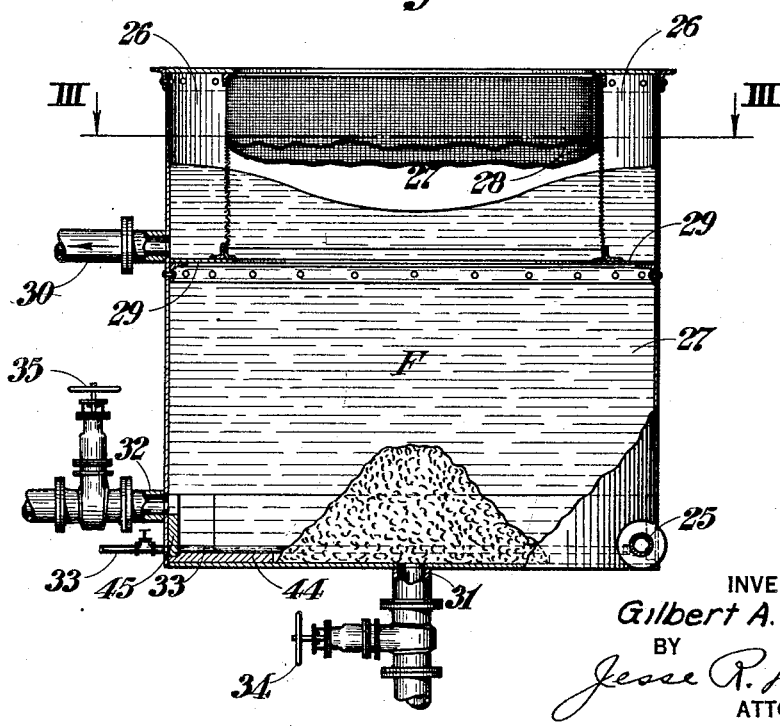

In order that my invention may be clearly set forth and understood, I describe a preferred embodiment of the same with reference to the accompanying drawings, which form a part of this specification for illustrative purposes. In these drawings, Figure 1 is a view, partially in elevation and partially in vertical section, of gas purification apparatus involving an absorption phase and an actification phase and showing means for adding insoluble material to the gas purification liquids in circulation;

Fig. 2 is a similar view of a portion of the apparatus shown in Fig. 1, wherein the addition of insoluble compound is effected; and Fig. 3 is a horizontal sectional view of the apparatus shown in Fig. 2 and taken along the line III—III of Fig. 2, the apparatus being shown empty in the interests of clarity.

Similar characters of reference designate the same parts in each of the several views of the drawings.

With reference to Fig. 1, the absorption phase of a process for the purification of gas involving the use of an alkaline suspension of an iron compound is effected in an absorber A. The absorber A comprises a vertical cylindrical shell 1 that is divided by means of a false bottom 2 into an upper chamber 3 and a lower chamber 4. The gas to be purified enters the lower part of the upper chamber 3, through an inlet pipe 5, and passes through a so-called cracker pipe 6.

The construction of the cracker pipe 6 is similar to that of the well-known bell saturator, being provided with a plurality of serrated edges along the lower portions thereof, the serrated edges being immersed in a body of the absorptive liquid, hereinabove described.

The gas passes under or through a plurality of serrations in the cracker pipe 6 and emerges in finely divided form beneath the surface of the liquid contained in the lower portion of the chamber 3, and a portion of the hydrogen sulphide content of the gas is thereby absorbed by the said liquid. The partially purified gas passes upward through the absorber A, passing around the outside periphery of a cone-shaped baffle 7 and traverses an assembly of distributive and contact means 8, which is disposed throughout the entire cross-sectional area of the upper portion of the chamber 3. Such distributive and contact means are described and claimed in copending application for Letters Patent of Frederick W. Sperr, Jr., Serial No. 21,980, filed April 9, 1925, and need not be described here in detail. The invention is not, however, limited to the employment of such specific means, as any of the devices well known in the art may be employed.

The alkaline absorptive liquid is introduced to the upper portion of the chamber 3 through a plurality of sprays 9 and passes downward through the distributive and contact means 8 in counter-current with the upwardly moving gas, absorbing the residual hydrogen sulphide therefrom. The purified gas escapes from the chamber 3 through an outlet pipe 10 and the partially fouled absorptive liquid falls into the lower portion of the chamber 3 and is there allowed to accumulate to an extent sufficient to substantially delay its passage therethrough.

Means for regulating the height of the accumulated liquid in the lower portion of the chamber 3 is provided in the form of a solution seal regulating device R and attendant piping. The regulating device R comprises a cylindrical vessel adjacent to the absorber A and communicating with the lower portion of the chamber 3 through a conduit 11, which is ordinarily kept closed by means of a valve 12 therein, and conduits 13 and 14. The conduit 13 terminates at the end opposite the absorber A in vertical conduit 14 and a horizontally disposed valve 15, which is ordinarily kept closed. The vertical conduit 14 passes through the bottom of the regulating chamber R and terminates within the latter, being provided, at its upper extremity, with a cylindrical sleeve 16, adjustably mounted thereon. The sleeve 16 is preferably threaded upon the conduit 14 in such manner as to allow desirable vertical adjustment by conveniently turning a handle 17, which communicates therewith.

The liquid within the chamber 3 fills conduits 13 and 14 and sleeve 16 and overflows the top of the latter, the height of the same determining the height of the communicating body of liquid surrounding the cracker pipe 6, and which it is occasionally desirable to regulate. The liquid overflowing the sleeve 16 passes through the lower portion of the cylinder R into a conduit 18, wherein is situate a trap 19, and enters a lower chamber 4 of the absorber A, where it is accumulated as above recited. Such accumulation is desirable both for the purposes of assuring an even and constant supply of liquid to a pump $P_1$ and for allowing for the completion of reactions within the purification liquid. Such a process is described and claimed in the copending application of Allison A. Kohr, Serial No. 43,347, filed July 13, 1925.

The liquid which has been in contact with gas and has subsequently been accumulated in the lower chamber 4 of the absorber A contains hydrogen sulphide in solution and iron in a sulphided state and must be revivified for further use. Furthermore, due to side reactions which may occur, involving the formation of ferro-cyanides and the like and also due to mechanical losses, the said liquid has been depleted with regard to iron compound and this loss must be made up in order to assure uniform operation of the system.

For this purpose, I provide a novel mixing tank F, through which a desired portion of the liquid may be passed in such a manner as to entrain in suspension a desirable quantity of fresh iron compound. The spent liquid leaves the absorber A through a line 20 and is forced by a pump $P_1$ through a line 21 and a header 22 into one or more of the plurality of compartments, or sub-divisions, of a thionizer or actification chamber T. By means of a valve 23, a portion of the said liquid is diverted from this course and is forced through a conduit 24. The conduit 24 terminates in a somewhat restricted nozzle 25, which enters the tank F near the bottom thereof, and tangentially with respect to the same, as shown more particularly in Figs. 2 and 3.

The mixing tank F is of cylindrical configuration, being separated into an upper and outer annular portion 26, and an inner remaining portion 27, by means of a cylindrical foraminous partition or screen 28 and a horizontal annular ledge 29. Communication of the liquid between the portions 26 and 27 is possible only through the screen 28, which is preferably coarse enough to allow free passage of the desired suspended matter and fine enough to prevent the passage of undesirable foreign matter, such as sticks, stones and the like. A screen which has been found to give excellent results in practice, comprises a rigid woven metal screen of four mesh,—that is, one which has four openings per linear inch, thus providing sixteen openings per square inch.

The upper and outer portion 26 of the tank F communicates with a normally open overflow conduit 30 and the lower portion 27 is provided with drains 31 and 32 in the bottom and side thereof, respectively, and also with a foraminous air supply pipe 33, which is disposed horizontally and adjacent to the bottom of the tank F. Iron oxide, or other insoluble material, is added as necessary to the tank F by simply dropping it into the central open portion thereof, and that portion not entrained by the swirling liquid accumulates on the bottom of the tank F.

The gas purification liquid is forced through the conduit 24 and the nozzle 25, emerging within the tank F at such a velocity as to cause a definite swirling movement of the body of liquid contained within the same. The action of the swirling liquid is such as to entrain in suspension the finer particles of the iron oxide, as well as the lighter foreign material contained thereby, and to break up the large and loose lumps which are common to this material. The residual matter consisting of large and heavy masses or lumps of iron oxide incapable of being sustained in solution in the liquid and also the heavy foreign matter, is drawn into the vortex of the swirling liquid and accumulates near the lower central portion of the tank F, as shown in Fig. 2. By opening a valve 34, this residual material may be withdrawn from the tank through a conduit 31 whenever it is desirable to do so, as, for example, when all the desirable portions have been removed.

The level of the liquid in the tank F rises past the annular ledge 29 until communication is established through the screen 28 between compartments 27 and 26, and the liquid entering compartment 26 is allowed to overflow through a conduit 30, which drains into the thionizer T, enriched with fresh iron oxide in suspension. Light and relatively coarse foreign material, as well as any large particles of iron oxide incapable of being permanently suspended in the liquid, are retained by the screen 28, and thus the liquid which leaves the tank F through the overflow conduit 30 contains iron oxide (or hydrate) in a very desirable state of suspension, being relatively finely divided and free from undesirable material. Should the lower portion of the screen 28 be clogged by foreign material or particles of the oxide, the level of the liquid rises until communication is established through unobstructed portions of the screen 28. The screen 28 is cleaned at intervals, and when necessary to do so.

I have found that it is desirable to protect the tank F from the erosive action of the jet of liquid from the nozzle 25. For this purpose, I provide a lining comprised of a plurality of cast-iron segmental plates 44 and vertical plates 45 in the lower and outer portion of the tank F. Such plates serve as wearing plates and resist the action of the swift, alkaline current.

The thionizer T, into which passes the fouled liquid, including that portion thereof which has passed through the tank F and has therein been strengthened by the addition of fresh iron compound, comprises an open tank provided with a plurality of porous diffusion means 36, through which air in very finely comminuted state is forcibly passed into the body of the fouled liquid, and is further provided with suitable baffling arrangements for lengthening the path of travel of the said liquid through the same, and a trough or launder 37 whereby froth or foam produced in the course of aeration may be accumulated or removed.

The liquid passing through the thionizer T and therein undergoing extremely efficient aeration and revivification is rejuvenated to such extent as to be capable of further use for absorption of hydrogen sulphide, and is withdrawn through a conduit 38, wherein is contained an air trap 39 through which any entrained air is allowed to escape into the atmosphere, and is pumped by a pump $P_2$ through a heater H and a conduit 40 into the plurality of sprays 9, which distribute the said liquid to the interior of the absorber A. The heater H may be any convenient type and serves to maintain the temperature of the liquid entering the absorber A at a temperature of from 80 degrees to 85 degrees F.

In order to compensate for losses of the alkaline material, a tank M is provided in such position as to allow a portion of the actified solution passing through the line 40 to be diverted into the same through a by-pass line 41. The tank M is kept supplied with a suitable quantity of sodium carbonate or other alkaline agent or any other soluble agent which it may be desired to add to the system. Regulated quantities of the strengthened liquid from the tank M are allowed to drain through a trapped downflow pipe 42 into the conduit 38 and thus re-enter the active cycle.

The porous diffusion means 36 hereinabove referred to may be any of the forms well-known in the art, but an especially suitable means has been found to consist in the vibratile tubular fabric aerators described and claimed in the copending application for Letters Patent of Gilbert E. Seil, Serial No. 21,978, filed April 9, 1925. A plurality of such aerators are supplied with air under pressure from a conduit 43.

My invention is capable of relatively great flexibility as regards the amount of material which it is capable of handling. Such flexibility is easily attained by varying the amount and/or velocity of liquid supplied to the tank F and the amount of oxide maintained therein, etc. To assist in agitating and bringing into suspension relatively large quantities of oxide, or other insoluble compound, I have provided a foraminous air supply pipe 33, which extends across the bottom of the tank F and through which compressed air may be introduced for the purpose of breaking up the accumulation of solid material within the said tank and for bringing into contact with the liquid these portions of the accumulation which might otherwise be prevented from coming in contact with the liquid by reason of their nature or position.

In the present instance, I have shown a gas purification system wherein the solution is forced by the action of a pump from the absorption or reaction stage to the actification stage, and I have utilized the forcible movement of the liquid introduced by the action of the pump to produce the desirable combination of agitation swirling action within my means for supplying the insoluble material to the liquid. It will be obvious, however, that, in many instances, the relative positions of the absorption and actification stages are such as to permit the flow of the fouled liquid from the former to the latter under the action of gravity, and, in such cases, when this gravitational flow is marked, the relative positions of the absorber A, the tank F and the thionizer T may be unchanged. However, when this desirable gravitational flow is less rapid, I may so position the tank F as to approximate or parallel the position of the alkali mixing tank M. In the latter instance, the solution which traverses the mixing tank F will be by-passed from the actified liquid lines 38 and 40.

An important detail to be observed in practice is that the overflow pipe 30, which provides communication between the tank F and the thionizer T, is preferably as short and as sharply pitched as is practical to make it in order to prevent clogging of the same.

In my invention, I have provided a convenient and accessible means for continuously supplying an insoluble compound to a cyclic liquid gas purification system, which requires practically no attention, and practically automatically supplies a desirable quantity and quality of such compound to the absorbent liquid of such a system, and of which the content of such material has been previously depleted by any of the causes hereinabove recited.

While my invention has, for purposes of exemplification, been described and illustrated in a particular embodiment, it is not limited to such specific use or embodiment, but is to be construed within the scope of the claims hereinafter made.

I claim as my invention:

1. A gas purification process which comprises continuously recirculating an absorptive suspension of metallic compound over the gas in an absorption stage and through an actification stage for regeneration, continuously diverting a portion of the recirculated liquid leaving said absorption stage, continuously suspending fresh metallic compound in said portion and returning it with the remaining portion of said liquid to said actification stage.

2. A gas purification process which comprises recirculating an alkaline suspension of a metallic compound through a cycle comprising an absorption stage and an actification stage, continuously withdrawing from the cycle a portion of said suspension, refreshing said portion by suspending therein fresh metallic compound, and returning said refreshed portion to the cycle.

3. In a gas purification process comprising the continuous recirculation of a liquid containing a metallic compound in suspension through a cycle comprising an absorption stage and a regeneration stage, the steps which comprise substantially continuously diverting a portion of said liquid from the cycle, suspending therein sufficient fresh metallic compound to compensate for chemical and mechanical losses, and returning said portion to the cycle.

4. In a gas purification process comprising the continuous recirculation of a liquid containing a metallic compound in suspension through a cycle comprising an absorption stage and a regeneration stage, the steps which comprise substantially continuously withdrawing a portion of said liquid from the cycle as said liquid travels from said absorption stage to said regeneration stage, suspending fresh metallic compound in said portion, and returning said portion to the main body of liquid at a point in the cycle between said point of withdrawal and said absorption stage.

In testimony whereof, I have hereunto subscribed my name this 16th day of June, 1926.

GILBERT A. BRAGG.